(12) United States Patent
Chiang et al.

(10) Patent No.: US 9,962,017 B2
(45) Date of Patent: May 8, 2018

(54) ADJUSTABLE SHOE RACK

(71) Applicants: Chun-Yi Chiang, Taichung (TW);
Chun-Hsien Chiang, Taichung (TW)

(72) Inventors: Chun-Yi Chiang, Taichung (TW);
Chun-Hsien Chiang, Taichung (TW)

( * ) Notice: Subject to any disclaimer, the term of this patent is extended or adjusted under 35 U.S.C. 154(b) by 6 days.

(21) Appl. No.: 15/098,016

(22) Filed: Apr. 13, 2016

(65) Prior Publication Data

US 2017/0295959 A1     Oct. 19, 2017

(51) Int. Cl.
*A47F 7/08* (2006.01)
*A47F 5/10* (2006.01)
*F16B 2/06* (2006.01)

(52) U.S. Cl.
CPC .................. *A47F 7/08* (2013.01); *A47F 5/10* (2013.01); *F16B 2/065* (2013.01)

(58) Field of Classification Search
CPC ...... A47F 7/08; A47F 5/02; A47F 5/10; A47G 25/005; A43D 117/00; A43D 115/00; A47B 61/04; A43B 5/0425; F16B 2/065
USPC ................................................... 211/34–38
See application file for complete search history.

(56) References Cited

U.S. PATENT DOCUMENTS

| | | | | |
|---|---|---|---|---|
| 790,669 A | * | 5/1905 | Winship | A45C 9/00 190/16 |
| 836,218 A | * | 11/1906 | Saunders | A47F 7/08 211/34 |
| 1,058,194 A | * | 4/1913 | O'Brien | A47F 7/08 200/86 R |
| 1,058,195 A | * | 4/1913 | Perkins | A47F 7/08 211/34 |
| 1,198,406 A | * | 9/1916 | Beaumont | A47F 7/08 211/34 |
| 1,710,940 A | * | 4/1929 | Murphy | A43D 117/00 211/36 |
| 1,720,892 A | * | 7/1929 | Hill | A43D 117/00 211/36 |
| 1,909,942 A | * | 5/1933 | Fingerman | A45C 3/12 206/278 |
| 1,924,158 A | * | 8/1933 | Jones | A47F 7/08 211/34 |
| 2,032,933 A | * | 3/1936 | Haumerson | A43D 117/00 12/123 |
| D118,646 S | * | 1/1940 | Morgan | 211/33 |

(Continued)

*Primary Examiner* — Patrick D Hawn
(74) *Attorney, Agent, or Firm* — Muncy, Geissler, Olds & Lowe PC (57) ABSTRACT

An adjustable shoe rack includes a support structure, at least one shoes plate, and at least one holding structure. The shoes plate is disposed on the support structure and is at a predetermined distance from a ground. The holding structure is disposed on a bottom face of the shoes plate and includes two clamping structures and a moving structure. The two clamping structures are parallel arranged. Each clamping structure includes a fixed clamping element and a movable clamping element wherein a clamping space is defined therebetween for receiving shoes. The two movable clamping elements are located between the two fixed clamping elements. The moving structure is located between the two movable clamping elements and is able to drive the two movable clamping elements to move toward opposite directions at the same time so as to alternate a width of the clamping space.

10 Claims, 9 Drawing Sheets

(56) References Cited

U.S. PATENT DOCUMENTS

| | | | | | |
|---|---|---|---|---|---|
| 2,243,947 | A | * | 6/1941 | Epstein | A47G 25/005 211/35 |
| 2,467,041 | A | * | 4/1949 | Konikoff | A47F 7/08 211/37 |
| 2,605,905 | A | * | 8/1952 | Willmott | A43D 117/00 211/34 |
| 2,695,105 | A | * | 11/1954 | Mitchell | A47B 61/04 211/35 |
| 2,977,000 | A | * | 3/1961 | Sitzman | A47L 23/20 211/34 |
| 4,192,424 | A | * | 3/1980 | Allsop | A47B 57/567 211/37 |
| 4,530,168 | A | * | 7/1985 | Petre | A43B 5/0425 211/35 |
| 5,024,408 | A | * | 6/1991 | Magee | A47F 7/08 211/34 |
| 8,714,370 | B2 | * | 5/2014 | Jebara | A45F 5/06 211/34 |
| 8,925,741 | B2 | * | 1/2015 | Chiang | A47G 25/005 211/118 |
| 2014/0097148 | A1 | * | 4/2014 | Cheng | A47B 61/04 211/34 |
| 2014/0319085 | A1 | * | 10/2014 | Chiang | A47G 25/005 211/37 |

\* cited by examiner

ADJUSTABLE SHOE RACK

BACKGROUND OF THE INVENTION

Field of the Invention

The present invention relates to a shoe rack, especially to a shoe rack for hanging shoes and boots reversely.

Description of the Prior Art

A conventional multilayer shoe rack only provides shoes plate for shoes to be placed thereon. As a result, the space above the shoes is wasted. To improve that, some shoe racks provide hanging devices under the shoe plate, such as clips, for hanging more shoes or boots.

However, the shoes or boots may be hurt by the clips, and the shoes or boots can not be placed stably.

Another shoe rack having a small cabinet under the shoe plate has been also disclosed. The cabinet is adapted for the head of the shoes or boots to insert therein so as to hang the shoes or boots. However, wider shoes may be unable to be received in.

SUMMARY OF THE INVENTION

The main object of the present invention is to provide an adjustable shoe rack having hanging structure whose width is adjustable for shoes in different widths.

To achieve the above and other objects, an adjustable shoe rack of the present invention includes a support structure, at least one shoes plate, and at least one holding structure.

The shoes plate is disposed on the support structure and is at a predetermined distance from a ground. The holding structure is disposed on a bottom face of the shoes plate. The holding structure includes two clamping structures and a moving structure. The two clamping structures are parallel arranged. Each clamping structure includes a fixed clamping element and a movable clamping element. A clamping space is defined between the fixed clamping element and the movable clamping element for receiving shoes. The two movable clamping elements are located between the two fixed clamping elements. The moving structure is located between the two movable clamping elements and is able to drive the two movable clamping elements to move toward opposite directions at the same time so as to alternate a width of the clamping space.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIG. 1 to FIG. 8, the adjustable shoe rack of the present invention includes a support structure 10, at least one shoes plate 20, and at least one holding structure. In the present embodiment, a plurality of shoes plates 20 and a plurality of holding structures are included, and a base plate 40 is also included.

Figure 1:
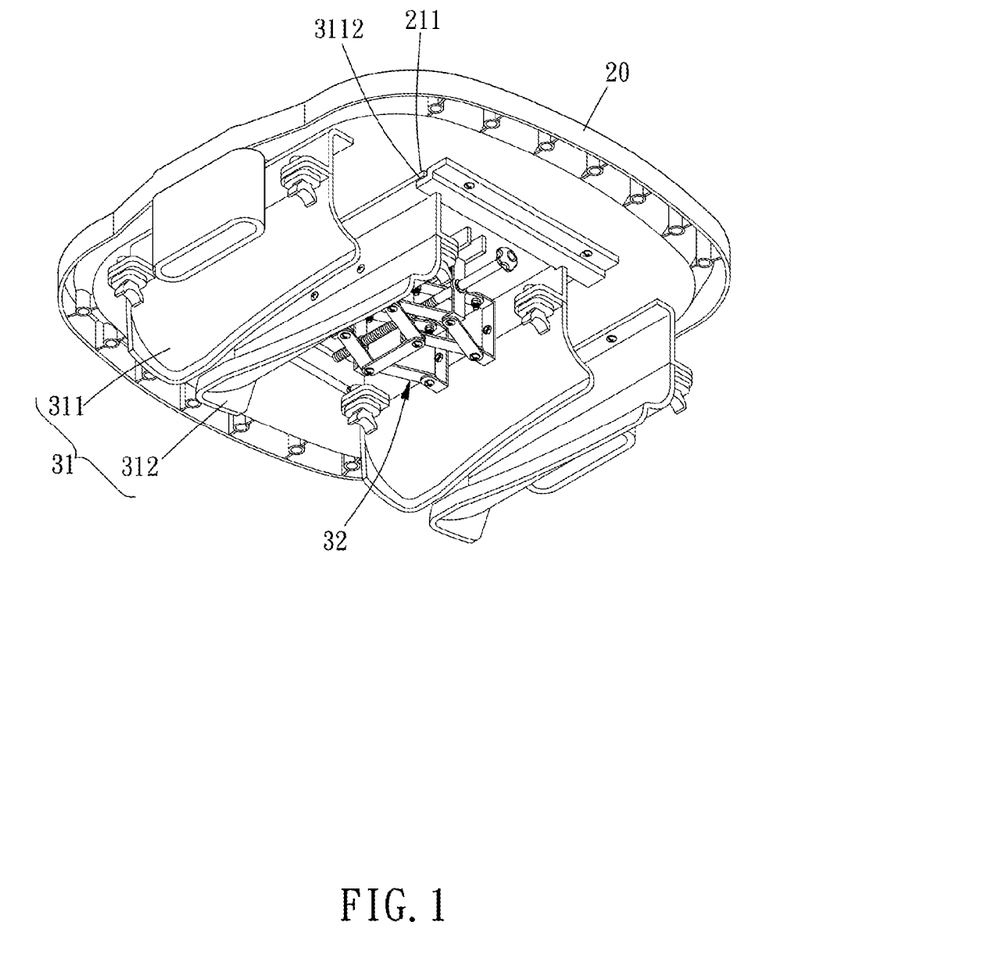
FIG. 1 is a partial stereogram of the present invention.
Figure 2:
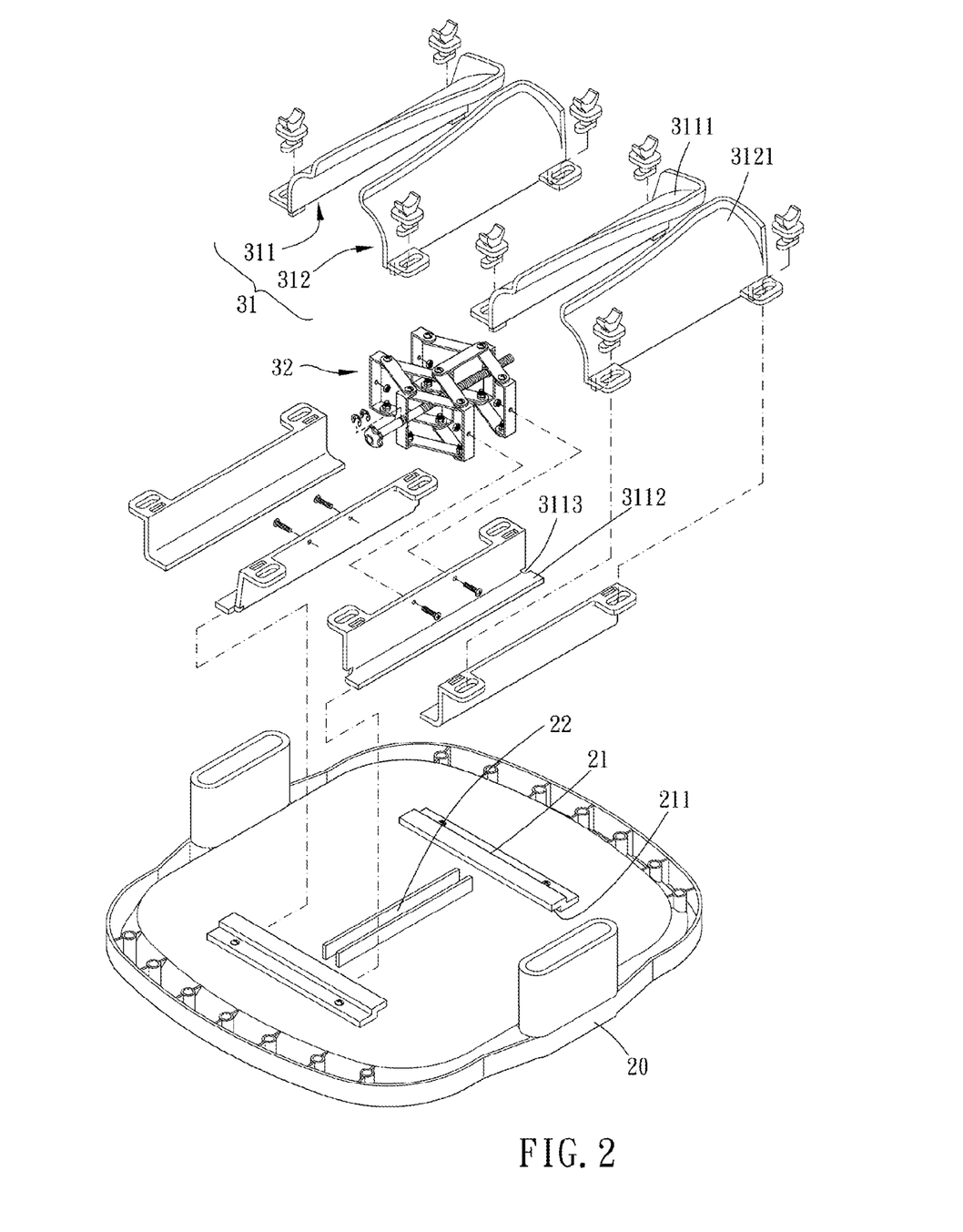
FIG. 2 is a partial breakdown drawing of the present invention.

The shoes plates 20 are spacedly disposed on the support structure 10, and the base plate 40 is located below the lowest one of the shoes plates 20. More specifically, the support structure 10 includes plural supporting columns connecting the base plates 40 and the shoes plates 20 thereamong so that the base plate 40 and the shoes plates 20 are spacedly aligned vertically.

Each holding structure is disposed on the bottom face of one of the shoes plates 20. The holding structure includes two clamping structures 31 and one moving structure 32. The clamping structures 31 are parallel arranged. Each clamping structure 31 includes a fixed clamping element 311 and a movable clamping element 312. A clamping space is defined between the fixed clamping element 311 and the movable clamping element 312 for receiving shoes. The two movable clamping elements 312 of the two clamping structures 31 are located between the two fixed clamping elements 311, and the moving structure 32 is located between the two movable clamping elements 312. The moving structure 32 is able to drive the two movable clamping elements 312 to move toward opposite directions to alternate the width of each clamping space.

Figure 5:
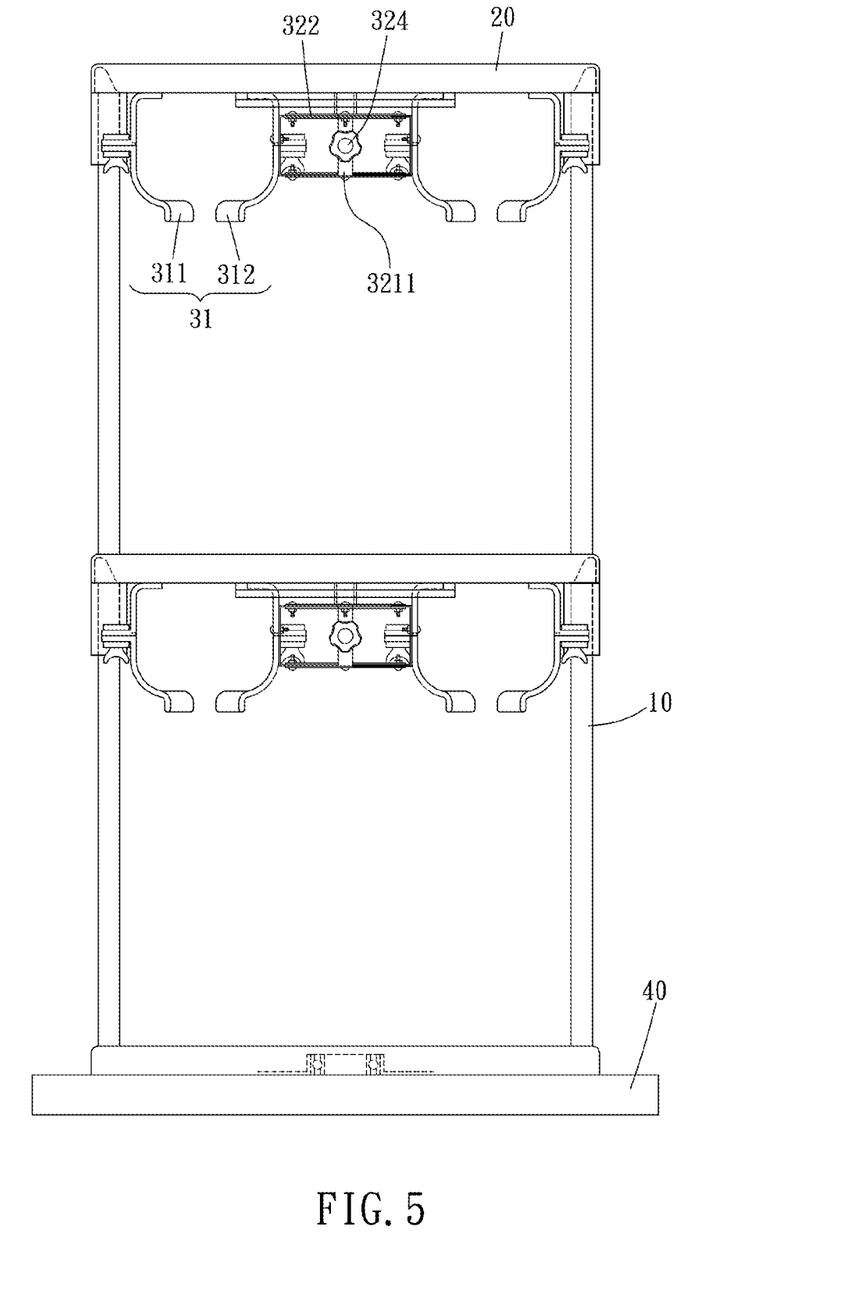
FIG. 5 is a front view of the present invention.

In the present embodiment, an end of each of the fixed clamping elements 311 and the movable clamping elements 312 away from the shoes plate 20 has a cambered face 3111,3121. The two cambered faces 3111,3121 face each other to correspond to the shape of shoes 50 to fit the shoes 50. Preferably, two ends of each cambered face 3111,3121 along a horizontal direction have various curvature radiuses to fit the shape of shoes 50 better.

Figure 3:
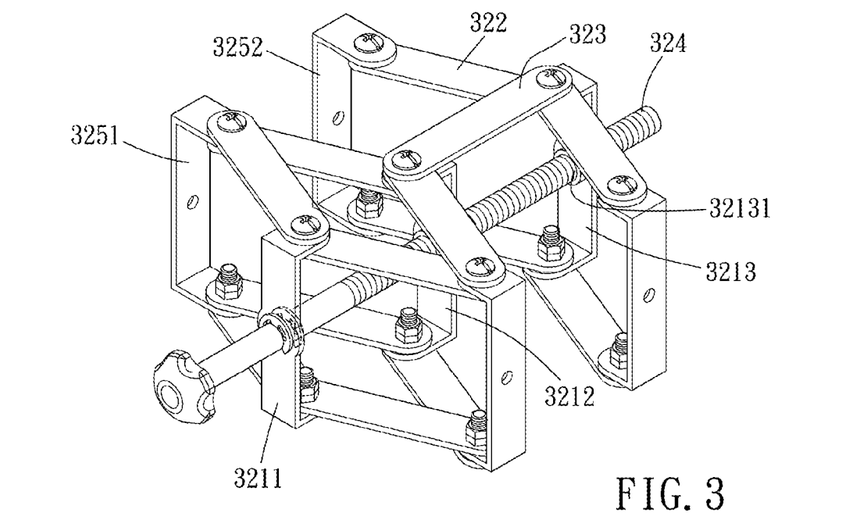
FIG. 3 is a stereogram of a moving structure of the present invention.
Figure 4:
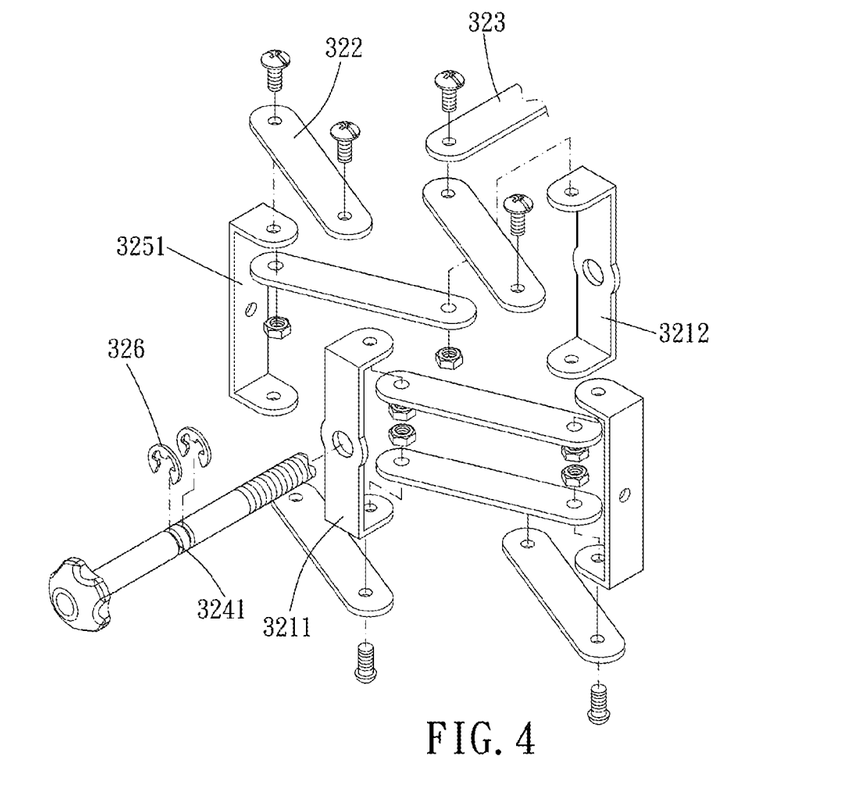
FIG. 4 is a partial breakdown drawing of a moving structure of the present invention.

Each moving structure 32 includes a plurality of sets of horizontal bars 322, at least one longitudinal bar 323, at least two vertical bars, and a bolt 324. Each set of the horizontal bars 322 includes at least two horizontal bars 322 pivotally connected to each other and connected to the two movable clamping elements 312 respectively. The longitudinal bar 323 is located between pivot portions of the horizontal bars 322 so as to retain a distance between the two horizontal bars 322 constant. The two vertical bars are disposed on pivot portions of various sets of the horizontal bars 322 respectively. One of the vertical bars is rotatably inserted through by the bolt 324 but is unable to move with respect to the bolt 324. The other one of the vertical bars is threadedly inserted through by the bolt 324. A distance between the two vertical bars is changed by rotating the bolt 324 in order to make the horizontal bars 322 of each set pivot with respect to each other so that a distance between the movable clamping elements 312 is alternated.

More specifically, each moving structure 32 further includes two front lateral bars 3251 and two rear lateral bars 3252. One of the front lateral bars 3251 and one of the rear lateral bars 3252 are separately positioned on one of the movable clamping elements 312. The other one of the front lateral bars 3251 and the other one of the rear lateral bars 3252 are separately positioned on the other one of the movable clamping elements 312. The moving structure 32 includes twelve the horizontal bars 322 and three the vertical bars. The vertical bars are aligned one by one between the front lateral bars 3251 and the rear lateral bars 3252 and are defined as a first vertical bar 3211, a second vertical bar 3212, and a third vertical bar 3213 from front to back. Two ends of the first vertical bar 3211 are pivotally connected to the two front lateral bars 3251 respectively by two of the horizontal bars 322 each. Two ends of the second vertical bar 3212 are also pivotally connected to the two front lateral bars 3251 respectively by two of the horizontal bars 322 each so that the horizontal bars 322 between the front lateral bars 3251 form a rhombus having changeable angles therein. Two ends of the third vertical bar 3213 are also pivotally connected to the other two rear lateral bars 3252 respectively by two of the horizontal bars 322 each. The longitudinal bar 323 is pivotally connected to the second vertical bar 3212 and the third vertical bar 213 therebetween. The bolt 324 is rotatably inserted through the first vertical bar 3211 but is unable to move with respect to the first vertical bar 3211. One of the second vertical bar 3212 and the third vertical bar 3213 is threadedly inserted through by the bolt 324.

Besides, the bolt 324 is formed with two annular grooves 3241 on a front end thereof. The two annular grooves 3241 are spacedly arranged. The two annular grooves 3241 are located at two opposite sides of the first vertical bar 3211 when the bolt 324 is inserted through the first vertical bar 3211. Two E-shaped positioning elements 326 are embedded in the two annular grooves 3241 respectively so that the bolt 324 is unable to move with respect to the first vertical bar 3211. In addition, each of the front lateral bars 3251, the rear lateral bars 3252, the first vertical bar 3211, the second vertical bar 3212, and the third vertical bar 3213 is substantially U-shaped.

Furthermore, the bottom face of the shoes plate 20 is disposed with two sliding rails 211 which are arranged separately. Each of two opposite ends of each movable clamping element 312 along a direction perpendicular to a moving direction of the movable clamping element 312 is formed with a sliding rib 3112. The two sliding ribs 3112 are slidably received in the sliding rails 211 to guide the movement of each movable clamping element 312. More specifically, each sliding rail 211 is enclosed by a Z-shaped plate 21 and the shoes plate 20. A notch 3113 is formed on each movable clamping element 312 near the sliding rib 3112. The Z-shaped plate 21 is embedded into the notch 3113. Besides, each shoes plate 20 is disposed with a restriction rail 22 located between the two sliding rails. The restriction rail 22 includes two plates perpendicular to the bottom face of the shoes plate 20. The longitudinal bar 323 is received in the restriction rail 22 so that the movement of the longitudinal bar 323 is restricted linearly. As a result, the front lateral bar 3251 and the front lateral bar 3252 may move at the same time, so the distance that the movable clamping elements move is kept the same. Preferably, the thickness of the longitudinal bar is at least twice the thickness of the horizontal bar, or the longitudinal bar includes two bars which are stacked together.

Figure 6:
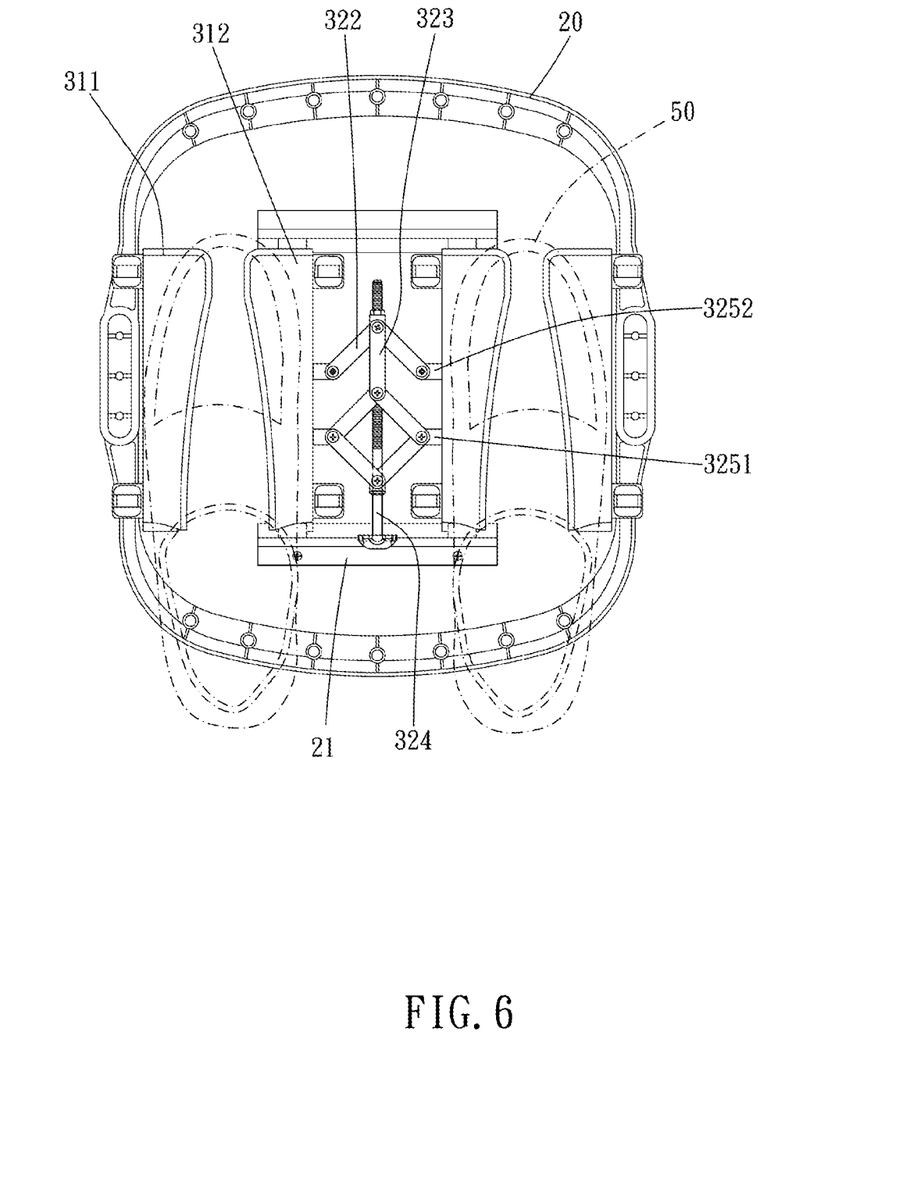
FIGS. 6 and 7 are illustrations of the present invention.
Figure 7:
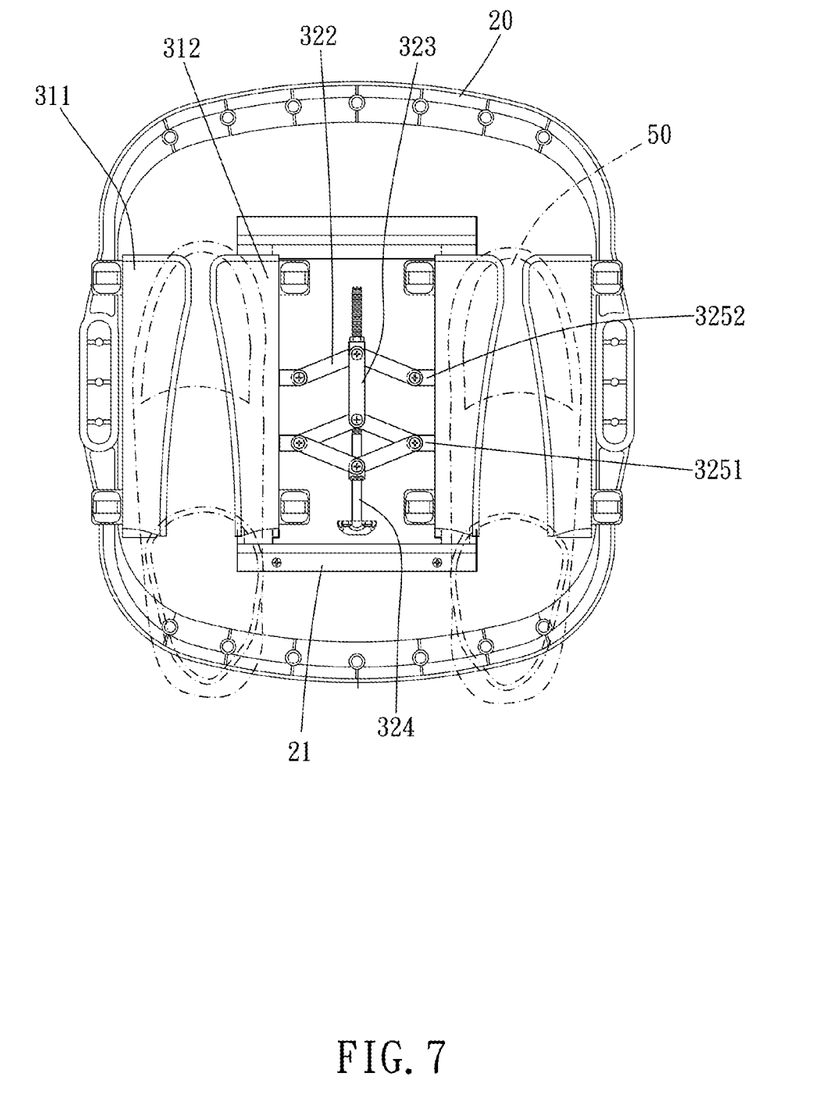
Figure 8:
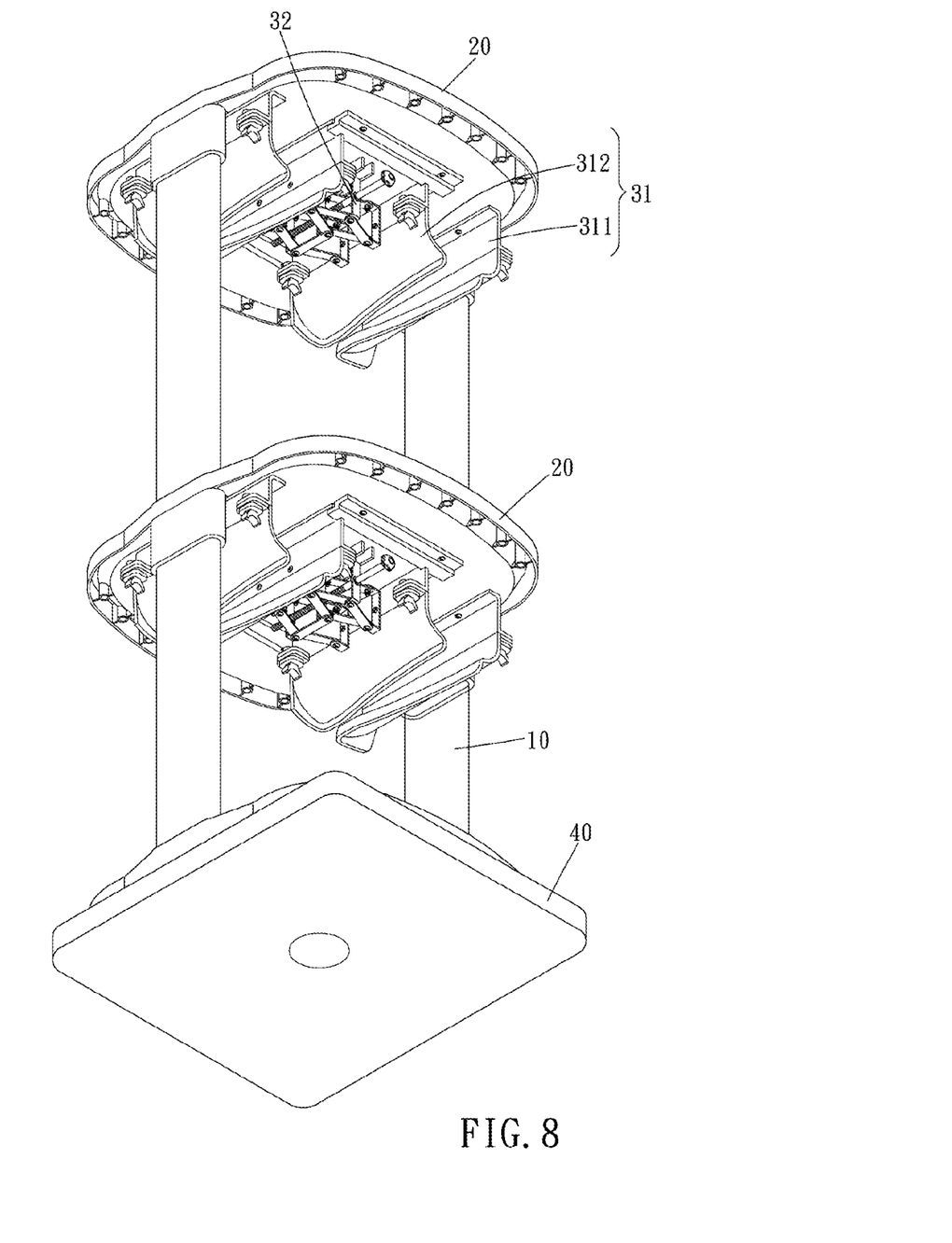
FIG. 8 is a stereogram of the present invention.

As a result, the user can alternate the width of the clamping space with the moving structure 32 based on the sizes of shoes to be received, or the user can place the shoes into the clamping space before moving the movable clamping elements 312 toward the fixed clamping elements 311 to clamp the shoes 50. Besides, the radian of the two ends of the cambered face differs, so the cambered face can fit the contour of the shoes 50 better.

Figure 9:
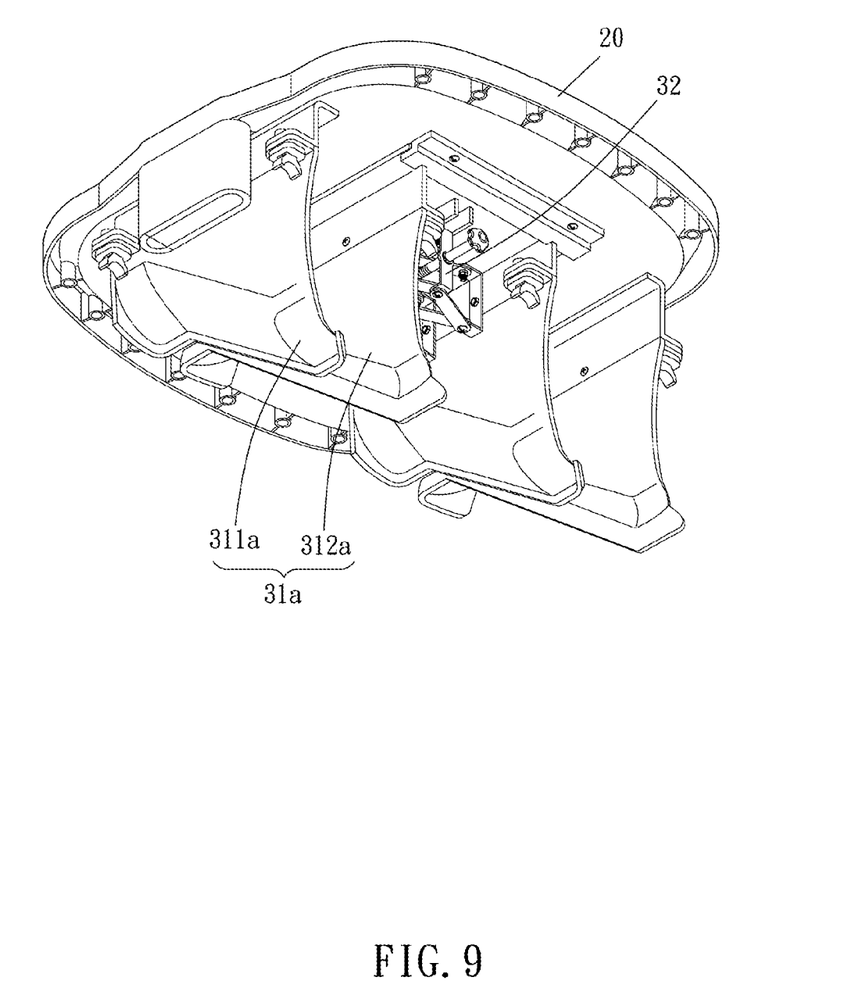
FIG. 9 is a partial stereogram showing a second embodiment of the present invention.
Figure 10:
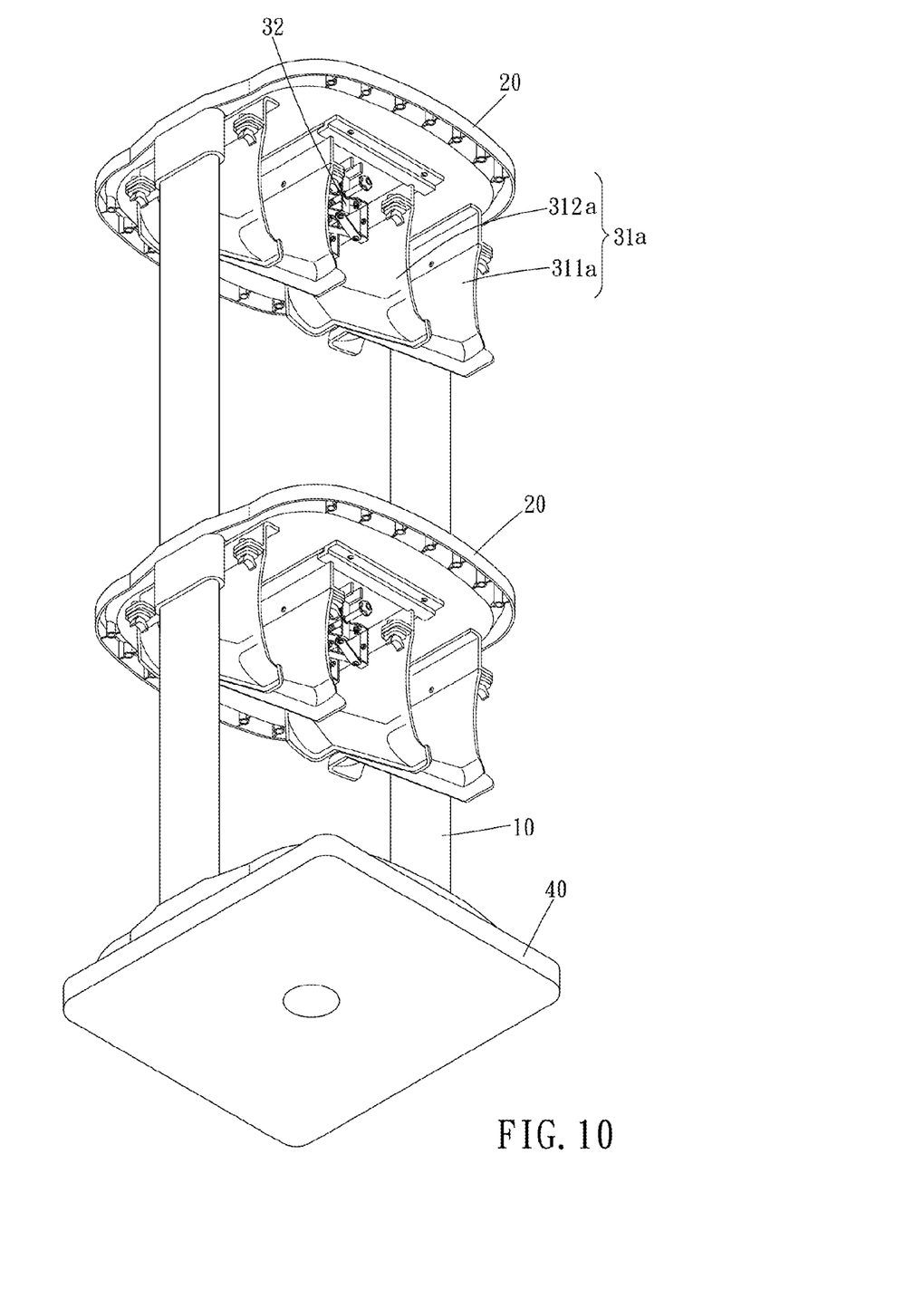
FIG. 10 is a stereogram showing a third embodiment of the present invention.

Another clamping structure 31a is shown in FIG. 9 to FIG. 10. The heights of two ends of the cambered face of the fixed clamping element 311a or the movable clamping element 312a vary to make the cambered face inclined so as to fit the contour of high heel boots. Thereby, the boots can be kept erect when being hung, and the head of the boots may not be compressed.

What is claimed is:

1. An adjustable shoe rack, including:
   a support structure;
   at least one shoes plate, disposed on the support structure, being at a predetermined distance from a ground;
   at least one holding structure, disposed on a bottom face of the shoes plate, the holding structure including two clamping structures and a moving structure, the two clamping structures being parallel arranged, each clamping structure including a fixed clamping element and a movable clamping element, a clamping space being defined between the fixed clamping element and the movable clamping element for receiving shoes, the two movable clamping elements being located between the two fixed clamping elements, the moving structure being located between the two movable clamping elements, the moving structure being able to drive the two movable clamping elements to move toward opposite directions at the same time so as to alternate a width of each of the clamping spaces.

2. The adjustable shoe rack of claim 1, including a plurality of the shoes plates and a plurality of the holding structures, further including a base plate, the shoes plates being spacedly arranged above the base plate, the shoes plates and the base plate being connected by the support structure.

3. The adjustable shoe rack of claim 1, wherein the moving structure includes a plurality of sets of horizontal bars, at least one longitudinal bar, at least two vertical bars, and a bolt, each set of the horizontal bars includes at least two horizontal bars pivotally connected to each other and connected to the two movable clamping elements respectively, the longitudinal bar is located between pivot portions of the horizontal bars so as to retain a distance between the two horizontal bars constant, the two vertical bars are disposed on pivot portions of various sets of the horizontal bars respectively, one of the vertical bars is rotatably inserted through by the bolt but is unable to move with respect to the bolt, the other one of the vertical bars is threadedly inserted through by the bolt, a distance between the two vertical bars is changed by rotating the bolt in order to make the horizontal bars of each set pivot with respect to each other so that a distance between the movable clamping elements is changeable.

4. The adjustable shoe rack of claim 3, wherein each moving structure further includes two front lateral bars and two rear lateral bars, one of the front lateral bars and one of the rear lateral bars are separately positioned on one of the movable clamping elements, the other one of the front lateral bars and the other one of the rear lateral bars are separately positioned on the other one of the movable clamping elements, the moving structure includes twelve of the horizontal bars and three of the vertical bars, the vertical bars are aligned one by one between the front lateral bars and the rear lateral bars and are defined as a first vertical bar, a second vertical bar, and a third vertical bar from front to back, two ends of the first vertical bar are pivotally connected to the two front lateral bars respectively by two of the horizontal bars each, two ends of the second vertical bar are also pivotally connected to the two front lateral bars respectively by two of the horizontal bars each so that the horizontal bars between the front lateral bars form a rhombus having changeable angles therein, two ends of the third vertical bar are also pivotally connected to the other two rear lateral bars respectively by two of the horizontal bars each, the longitudinal bar is pivotally connected to the second vertical bar and the third vertical bar therebetween, the bolt is rotatably inserted through the first vertical bar but is unable to move with respect to the first vertical bar, one of the second vertical bar and the third vertical bar is threadedly inserted through by the bolt.

5. The adjustable shoe rack of claim 4, wherein the bolt is formed with two annular grooves on a front end thereof, the two annular grooves are spacedly arranged, the two annular grooves are located at two opposite sides of the first vertical bar when the bolt is inserted through the first vertical bar, two E-shaped positioning elements are embedded in the two annular grooves respectively so that the bolt is unable to move with respect to the first vertical bar.

6. The adjustable shoe rack of claim 4, wherein each of the front lateral bars, the rear lateral bars, the first vertical bar, the second vertical bar, and the third vertical bar is substantially U-shaped.

7. The adjustable shoe rack of claim 1, wherein the bottom face of the shoes plate is disposed with two sliding rails which are arranged separately, each of two opposite ends of the base portion of each movable clamping element along a direction perpendicular to a moving direction of the base portion is formed with a sliding rib, the two sliding ribs are slidably received in the sliding rails to guide the movement of each movable clamping element.

8. The adjustable shoe rack of claim 7, wherein each sliding rail is enclosed by a Z-shaped plate and the shoes plate, a notch is formed on the base portion of each movable clamping element near the sliding rib, the Z-shaped plate is embedded into the notch.

9. The adjustable shoe rack of claim 1, wherein an end of each of the fixed clamping elements and the movable clamping elements away from the shoes plate has a cambered face to fit a shoe received in the clamping space.

10. The adjustable shoe rack of claim 9, wherein a curvature radius of one end of each cambered face along a horizontal direction is different from a curvature radius of an other end of the cambered face along the horizontal direction.

* * * * *